Sept. 27, 1949.                L. W. MELCHER                2,482,924
                            ENGINE-GENERATOR UNIT
Filed Feb. 28, 1947                                        5 Sheets-Sheet 1

Inventor
Lee W. Melcher
By Fred Gerlach, Atty.

Sept. 27, 1949.  L. W. MELCHER  2,482,924
ENGINE-GENERATOR UNIT

Filed Feb. 28, 1947  5 Sheets-Sheet 3

Fig. 6

Inventor
Lee W. Melcher
By Fred Gerlach Atty

Sept. 27, 1949.    L. W. MELCHER    2,482,924
ENGINE-GENERATOR UNIT
Filed Feb. 28, 1947    5 Sheets-Sheet 4

FIG. 7.

Inventor
Lee W. Melcher
By [signature], Atty.

Sept. 27, 1949.   L. W. MELCHER   2,482,924
ENGINE-GENERATOR UNIT

Filed Feb. 28, 1947   5 Sheets-Sheet 5

Inventor
Lee W. Melcher
By Fred Gerlach
Atty.

Patented Sept. 27, 1949

2,482,924

UNITED STATES PATENT OFFICE 2,482,924

ENGINE-GENERATOR UNIT

Lee W. Melcher, Oconomowoc, Wis., assignor to Waukesha Motor Company, Waukesha, Wis.

Application February 28, 1947, Serial No. 731,567

11 Claims. (Cl. 290—1)

1

The present invention relates generally to engine-generator units. More particularly the invention relates to that type of engine-generator unit which is adapted primarily for use in connection with a railroad car, serves when in operation to charge the battery and supply electric current to the various electric motors and appliances for the car, and comprises a liquid cooled internal combustion engine and an electric generator in longitudinal alignment and connected relation with the engine and, in addition, an elongated box-like housing which is designed to be positioned and supported under the railroad car, embodies a central transversely extending partition whereby the interior thereof is divided into two compartments, and has the engine disposed in one compartment and the generator disposed in the other.

One object of the invention is to provide an engine-generator unit of this type which is an improvement upon, and has certain inherent advantages over, previously designed units and is characterized by the fact that it possesses extremely high efficiency by reason of the fact that it includes simple and novel means for effecting cooling of the engine and the generator.

Another object of the invention is to provide an engine-generator unit of the type under consideration in which the cooling system for the engine embodies a radiator in the generator compartment in the housing, the generator embodies for cooling purposes a closed air circulating system including a plurality of heat exchanger tubes that are disposed outwards of the side portions of the generator shell, and the means for effecting cooling of the engine and the generator comprises in addition to the aforesaid systems, power driven fans for causing air to circulate through the generator compartment in the housing and past the radiator and the tubes.

A further object of the invention is to provide an engine-generator of the last mentioned character in which the elongated box-like housing has in the side walls thereof a pair of openings in communication with the sides of the generator compartment and embodies in the end wall thereof that defines the outer end of the generator compartment openings in which the power driven fans are disposed, and the radiator constituting a part of the cooling system for the internal combustion engine consists of a pair of separate or independent radiator units which are located outwards of the heat exchanger tubes at the sides of the shell of the generator and extend across

2 the aforementioned openings in the side walls of the housing.

A still further object of the invention is to provide an engine-generator unit which is generally of new and improved construction, effectively and efficiently fulfills its intended purpose and embodies a novel and compact arrangement of parts.

Other objects of the invention and the various advantages and characteristics of the present engine-generator unit will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views.

The engine-generator unit which is shown in the drawings constitutes the preferred form or embodiment of the invention. It is illustrated in the drawings as being disposed under a railroad car C. The purpose of the unit is to charge the battery and supply electric energy to the usual electric motors and appliances for the car. Preferably the unit is positioned so that it extends lengthwise of the railroad car C and has associated therewith roller and track means whereby it may be shifted back and forth between a normal operating position wherein it is disposed under the car and an inspection position wherein it is disposed outwards of one side of the car. For a disclosure of suitable roller and track means for supporting the unit reference may be had to my copending patent application filed June 12, 1947, and serially numbered 751,871. As its principal components or parts the unit comprises an elongated box-like housing 10, an internal combustion engine 11 and a generator 12.

The housing 10 is fabricated from suitable metal and serves as an enclosure for the engine 11 and the generator 12. It is approximately twice as long as it is wide and consists of a horizontally extending bottom 13, a pair of vertically extending laterally spaced side walls 14, a pair of vertically extending end walls 15 and 16 and a horizontally extending top wall 17. These walls are fixedly secured together in order that the housing as a whole is rigid. In addition to the aforementioned walls the box-like housing 10 comprises a central transversely extending partition 18 and this serves to divide the interior of the housing into an engine compartment 19 and a generator compartment 20. As shown in the drawings the partition 18, except for certain parts that extend snugly therethrough, is imperforate to the end that the two chambers 19 and 20 are not in communication with one another. The end wall 15 defines the outer end of the engine compartment 19 and the end wall 16 defines the outer end wall of the generator compartment 20. The last mentioned end wall, i. e., the end wall 16, is preferably disposed a comparatively small distance inwards of the adjacent end edges of the bottom, side and top walls of the housing. The end portions of the side walls that define the sides of the engine compartment 19 have rectangular openings 21 in order to provide access to the engine compartment. Removable panels 22 fit within and serve normally to close the openings 21. The end portion of the top wall that defines the top of the engine compartment has a rectangular opening 23 across which extends a screen type panel 24 whereby ventilation of the engine compartment is provided. The end portions of the housing side walls that define the sides of the generator compartment 20 are provided with large sized rectangular openings 25. Removable screen type panels 26 fit within, and extend across the last mentioned openings. The end portion of the top wall that defines the top of the generator compartment has a rectangular opening 27 whereby access to the generator compartment is provided. A substantially imperforate removable panel 28 fits within, and extends across, the opening 27 and serves normally to close the latter. The end wall 16 of the housing has in the lower central portion thereof a circular hole 29. It also has in its upper corner portions a pair of spaced apart circular holes 30. As hereinafter described more in detail, the rectangular openings 25 in the housing side walls 14 and the circular holes 30 in the upper corner portions of the end wall 16 permit air to circulate or pass through the generator compartment 20. Cylindrical sleeves 31 are connected to, and project outwards from, the portions of the end wall 16 that define the circular holes 30 and these have in the outer ends thereof grills 32.

Figure 1:
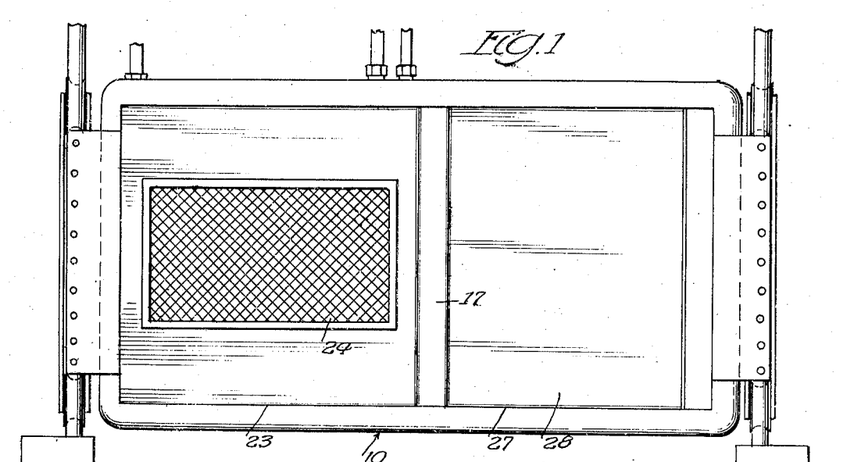
Figure 1 is a plan view of an engine-generator unit embodying the invention.
Figure 2:
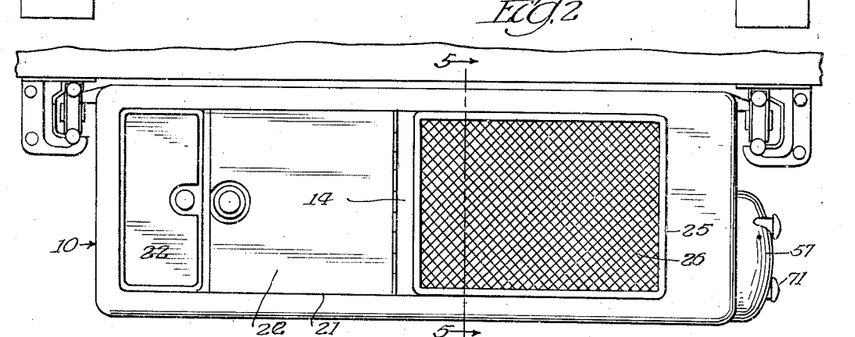
Figure 2 is a side elevation.
Figure 3:
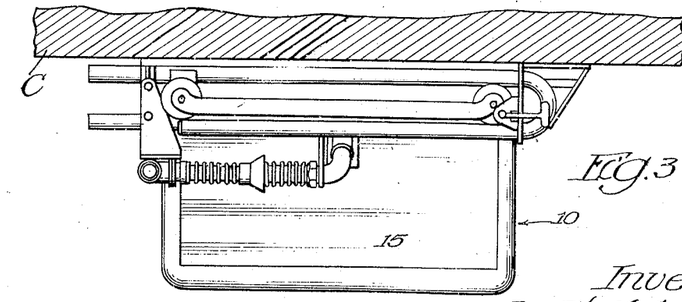
Figure 3 is an end view looking toward the end of the housing having the engine mounted therein.
Figure 4:
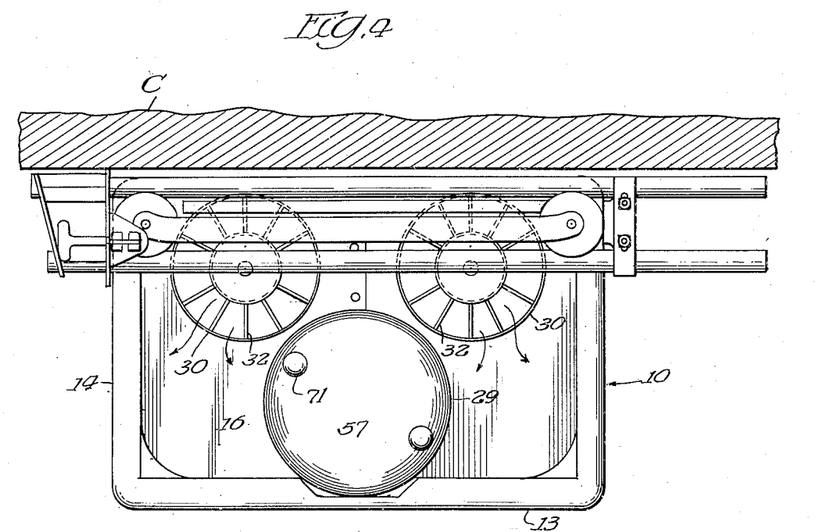
Figure 4 is an enlarged end view looking toward the end of the housing that has the generator mounted therein.
Figure 5:
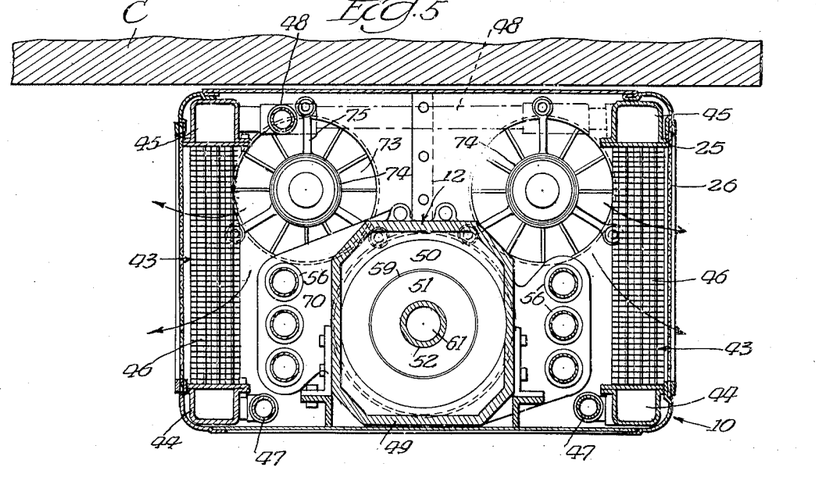
Figure 5 is an enlarged vertical transverse section taken on the line 5—5 of Figure 2.
Figure 6:
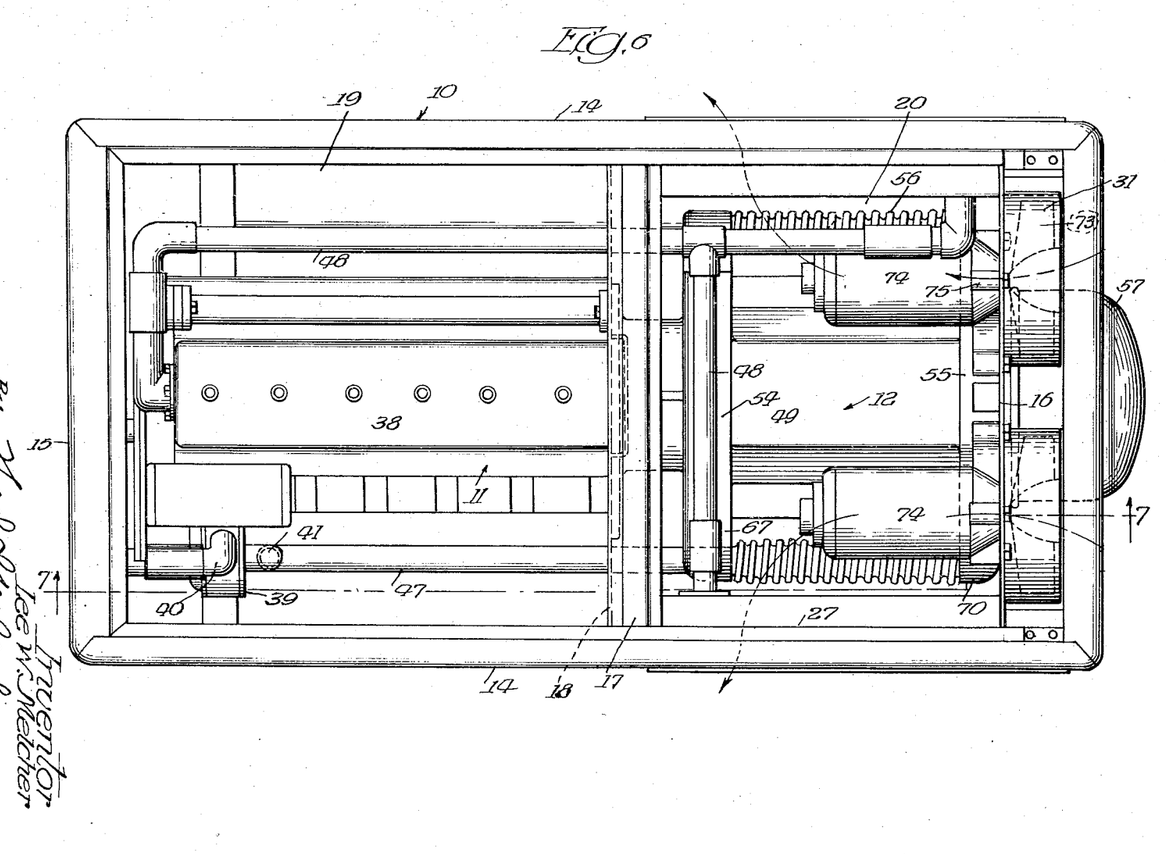
Figure 6 is an enlarged plan view of the unit showing the housing without the removable panels on the top wall thereof.
Figure 7:
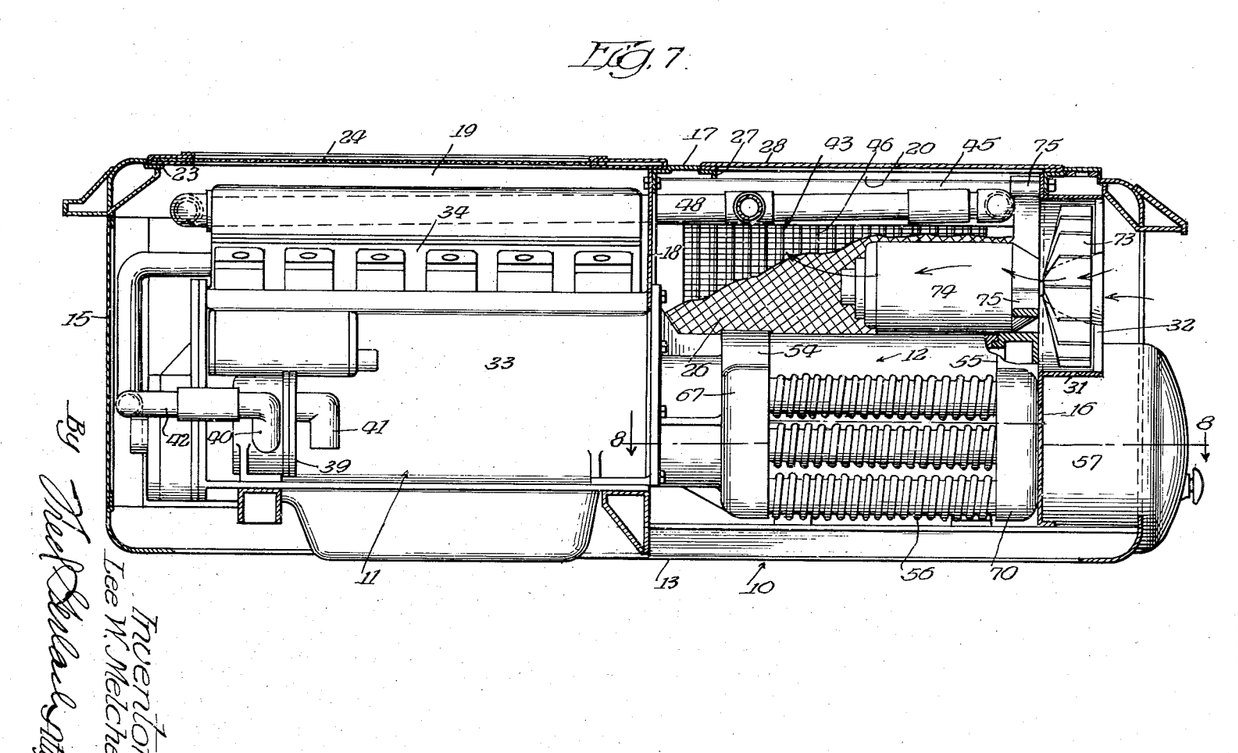
Figure 7 is a horizontal section on the line 7—7 of Figure 6.

The internal combustion engine 11 is disposed and suitably mounted within the engine compartment 19 in the housing and is of the liquid cooled variety. It serves as a prime mover or driving instrumentality for the generator 12 and extends lengthwise of the housing 10. As shown in Figure 7, the engine 11 comprises a crank case 33, a cylinder block 34 on top of the crank case, and a crank shaft 35 in the crank case. Suitable bearings in the crank case serve rotatably to support the crank shaft. The inner end of the crank shaft extends through a hole 36 in the central transversely extending partition 18 of the housing 10 and is provided with a flywheel 37. The cylinder block 34 of the engine is jacketed and is surmounted by a cylinder head 38 which has jacket in communication with the jacket of the cylinder block. The cooling system for the engine 11 comprises a pump 39 and a composite radiator. The pump 39 is located at one side of the crank case of the engine. It is driven in any suitable manner from one of the driven parts of the engine, such, for example, as the crank shaft and has an inlet nipple 40 and an outlet nipple 41. The inlet nipple 40 of the pump is connected by a pipe connection 42 to the jacket of the cylinder block 34. The radiator is disposed within the generator compartment 20 in the housing 10 and consists of two similar radiator units 43. The latter extend across, and are disposed directly inwards of, the rectangular openings 25 in the housing side walls 14 and consist of lower headers 44, upper headers 45, and vertically extending fin equipped tubes 46 between the lower and upper headers. A suitable pipe arrangement 47 serves to connect the outlet nipple 41 of the pump 39 to the lower headers 44 of the radiator units 43, and a suitable pipe arrangement 48 serves to connect the upper headers 45 to the water jacket of the cylinder head 38. When the engine 11 is in operation the pump operates continuously to circulate the liquid constituting the coolant for the engine cooling system through the pipe arrangement 47, the lower headers 44, the tubes 46, the upper headers 45, the pipe arrangement 48 and the jackets in the cylinder head 38 and the cylinder block 34.

Figure 8:
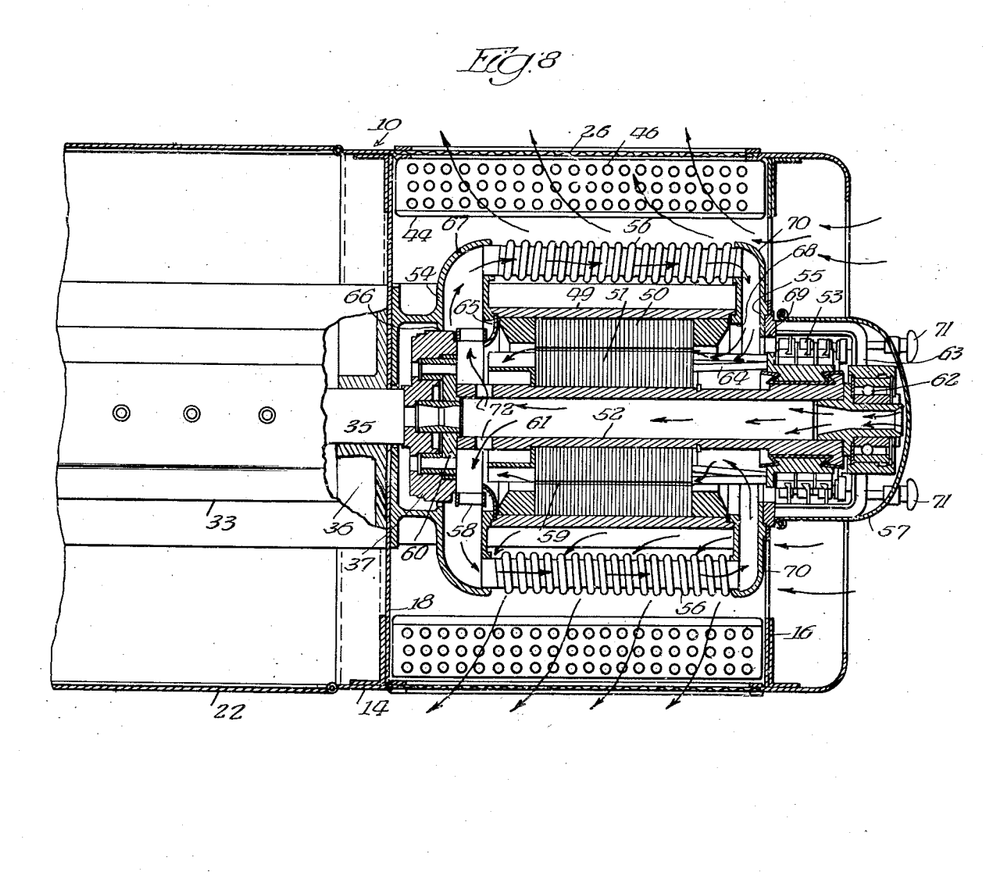
Figure 8 is a horizontal section through the generator.

The generator 12 is disposed and suitably mounted within the generator compartment 20 in the housing 10 and as its principal parts or components comprises a shell 49, a stator 50, an armature 51, a hollow armature shaft 52, a commutator 53, a pair of manifolds 54 and 55, a plurality of heat exchanger tubes 56, a cup-shaped housing 57 and a fan 58. As hereinafter described more in detail, the hollow armature shaft 52, the manifolds 54 and 55, the tubes 56, the housing 57 and the fan 58 constitute a closed air circulating system which, when the generator is in operation, serves to dissipate the heat that is produced by the generator. As shown in the drawings the generator is longitudinally aligned with the water cooled internal combustion engine 11. The shell 49 of the generator 12 surrounds the stator 50 and armature 51 and is open ended. The stator is in the form of field windings or coils and fits within, and is suitably secured to the central portion of the inner face or periphery of the shell 49. It is of conventional design or construction and causes, in connection with drive or rotation of the armature the generation of electrical current in the armature. The armature 51 is spaced from the stator to form a tubular air passage 59 and surrounds, and is fixedly secured to, the central portion of the shaft 52. As shown in Figure 8 the inner end of the armature shaft is connected to the flywheel 37 of the internal combustion engine 11 by way of a coupling 60 in order that the shaft together wth the armature is driven by the engine in connection with operation of the latter. The inner periphery of the armature shaft 52 defines a full length longitudinal centrally disposed air passage 61. The other or outer end of the armature shaft 52 is rotatably supported by way of a ball bearing 62 which is carried by a spider-like bracket 63. The commutator 53 is mounted on, and fixedly secured to, the outer end of the armature shaft and is disposed between and spaced from the ball bearing 62 and the adjacent end of the armature 51. It has brushes associated therewith and these are carried by the bracket 63. The risers of the commutator are electrically connected to the windings of the armature 51 by way of an annular series of spaced apart, longitudinally extending bars 64. As illustrated in the drawings the outer end of the armature shaft projects outwards of the outer end of the cylindrical shell 49.

The manifold 54 surrounds the inner end of the armature shaft 52 and comprises spaced apart inner and outer end walls and a continuous side wall. The inner end wall is fixedly secured to the inner end of the shell 49 and has a centrally disposed circular hole 65 which is substantially the same in diameter as, and registers with, the inner periphery of the shell and establishes communication between the interior of the manifold 54 and the inner end portion of the interior of the shell. The outer end wall of the manifold 54 is bolted to the inner end wall of the engine crank case 33 and has a centrally disposed circular hole 66 in which the inner end of the crank shaft 35 is disposed. The side portions of the manifold 54 are shaped to form a pair of oppositely disposed hollow extensions 67 and these project outwards of the side portions of the shell 49. The other manifold, i. e., the manifold 55, surrounds the outer end of the armature shaft 52 and is located directly outwards of the outer end of the shell 49. It comprises spaced apart inner and outer end walls and a continuous side wall between the two end walls. The inner end wall is fixedly secured to the outer end of the shell 49 and has a centrally disposed circular hole 68 which is substantially the same in diameter as, and registers with, the inner periphery of the shell and serves to establish communication between the interior of the manifold 55 and the outer end portion of the interior of the generator shell 49. The outer end wall of the manifold 55 has a centrally disposed circular hole 69 and this is of slightly less diameter than, and is arranged in concentric relation with, the circular hole 69. The side portions of the manifold 55 are shaped to form a pair of oppositely disposed hollow extensions 70 which project outwards of the side portions of the shell 49 and are horizontally aligned with the side extensions 67 of the manifold 54. The outer portion of the spider-like bracket 63 fits against, and is suitably secured to, the inner marginal or hole defining portion of the outer end wall of the manifold 55.

The heat exchanger tubes 56 are disposed outwards of the side portions of the shell 49 and extend longitudinally of the shell. As best shown in Figure 8 the tubes 56 are disposed substantially midway between the radiator units 43 and the side portions of the shell 49. Preferably there are three tubes adjacent each side portion of the shell. The tubes extend and establish communication between the side extensions 67 of the manifold 54 and the side extensions 70 of the manifold 55. They are helically or spirally corrugated from end to end and serve as heat exchangers for the closed air circulating system consisting of the hollow armature shaft 52, the manifolds 54 and 55, the tubes 56, the housing 57 and the fan 58. As hereinafter described more in detail air under pressure enters the side extensions 67, then flows through the heat exchanger tubes 56 and into the hollow side extensions 70 of the manifold 55.

The cup-shaped housing 57 surrounds and houses the outer end of the armature shaft 52 and also the commutator 53 and the spider-like bracket 63. It is removably secured in place by a pair of handle equipped bolts 71 and fits within and extends through the circular hole 29 in the end wall 16 of the box-like housing 10.

The fan 58 is disposed within the manifold 54 and surrounds the inner end of the hollow or tubular armature shaft 52. Said end of the armature shaft is provided with a pair of diametrically opposite transversely extending holes 72 in order to establish communication between the inner end of the interior of the armature shaft and the interior of the manifold 54. The fan 58 is of the so-called squirrel cage variety and is bolted or otherwise fixedly secured to the outer marginal portion of the flywheel 37 in order that it is driven conjointly with the armature shaft and the armature in connection with operation of the internal combustion engine 11. As shown in Figure 8 the fan is disposed between the inner marginal portions of the inner and outer end walls of the manifold 54. In connection with drive or rotation of the armature shaft 52 the fan operates to draw air longitudinally through the passage 61 in the armature shaft and the tubular passage 59 between the armature and the stator as indicated by arrows in Figure 8. The air which is drawn into the interior of the manifold 54 from the passages 61 and 59 is forced under pressure to flow successively through the hollow side extensions 67 of the manifold 54, the helically or spirally corrugated heat exchanger tubes 56 and the hollow side extensions 70 of the manifold 55. From the last mentioned side extensions a portion of the air under pressure flows inwards into the receiving end of the tubular air passage 59 and the balance of the air flows inwards past the commutator and into the outer or receiving end of the longitudinal passage 61 in the armature shaft 52. During drive or rotation of the armature shaft the fan is driven conjointly with the shaft and operates to maintain a continuous circulation of air in the generator. The air during flow through the passages 59 and 61 absorbs heat from the stator and the armature and such heat is dissipated to the ambient or surrounding air during flow of the air under pressure through the externally disposed heat exchanger tubes 56.

For a more detailed description of the generator and its construction and mode of operation reference may be had to my copending patent application filed October 4, 1946 and serially numbered 701,351, now Patent Number 2,453,449.

In addition to the parts heretofore recited the engine-generator unit comprises a pair of fans 73 for causing air to circulate through the generator compartment 20 and past the radiator units 43 and the heat exchanger tubes 56. These fans are disposed within the cylindrical sleeves 30 and are driven by a pair of electric motors 74. The latter are disposed in laterally spaced relation in the outer end portion of the generator compartment 20 and are supported by way of spiders 75 so that they are disposed horizontally and extend lengthwise of the housing 10. The outer portions of the spiders are bolted or otherwise fixedly secured to the end wall 16 of the housing 10 and the other or inner portions of the spiders are suitably fixedly connected to the outer ends of the motors. The outer ends of the armature shafts of the motors fit within, and are keyed to, the hubs of the fans 73. The fans are preferably driven so that they draw air into the generator compartment 20 via the circular holes 30 in the housing end wall 16. The air which is drawn into the generator compartment by the fans is caused to flow rearwards under pressure and after passing or circulating around the heat exchanger tubes 56 flows outwards through the radiator units 43. After passing through the radiator units 43 the air under pressure is exhausted to outside atmosphere via the rectangular openings 25 in the side walls 14 of the housing 10. As the air under pressure flows past the heat exchanger tubes 56 and then through the radiator units 43 it absorbs heat from the tubes and the radiator units. The air under pressure when flowing through the radiator units passes by or around the vertically extending fin equipped tubes 46 that form part of the radiator units and serve to connect and establish communication between the lower and upper headers 44 and 45. If desired, the fans 73 may be reversely driven. In such case the air circulates reversely through the generator compartment 20. In other words, when the fans 73 are reversely driven air is drawn into the generator compartment 20 through the rectangular openings 25 in the housing side walls 14, then flows through the radiator units 43 and past and around the heat exchanger tubes 56. After passing the tubes the air is exhausted from the generator compartment 20 via the circular holes 30 in the upper corner portions of the housing end wall 16. Regardless of the direction in which the fans 73 are driven the air that circulates through the generator compartment flows past the heat exchanger tubes 56 and the radiator units 43 and effects cooling thereof by way of heat absorption. By mounting the radiator units 43 constituting the radiator of the cooling system of the internal combustion engine 11 in the generator compartment 20 the fans 73 have a twofold purpose in that they serve, in connection with drive thereof, to effect cooling of the radiator units as well as the heat exchanger tubes 56 forming parts of the closed air circulating system for the generator 12. It is contemplated that the electric motors 74 for driving the fans 73 will be supplied with current as soon as the engine 11 is placed in operation in order that air circulation through the generator compartment will take place immediately upon starting of the engine.

The herein described engine-generator unit effectively and efficiently fulfills its intended purpose and possesses high efficiency as the result of the manner in which the cooling of the radiator units 43 and the heat exchanger tubes 56 is effected. The cooling of the radiator units of the cooling system for the internal combustion engine 11 and the heat exchanger tubes 56 constituting parts of the closed air circulating system of the generator 12 provides the desired thermal balance so far as the engine and generator are concerned. By having the radiator units 43 and the heat exchanger tubes 56 disposed in the generator compartment 20 the engine-generator unit as a whole is compact and occupies but a comparatively small space. By having the radiator units extend lengthwise of the housing 10 the units are cooled equally irrespective of the direction of travel of the car to which the unit is applied. Another advantage or feature in mounting or disposing the radiator units 43 in the generator compartment 20 resides in the fact that the engine compartment 19 is unencumbered and hence ready access may be had to the engine by way of the openings 21 in the housing side walls 14.

Whereas the engine-generator unit has been described in connection with a railroad car C it is to be understood that it has other capabilities of use. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. An engine-generator unit comprising a housing having disposed therein a substantially imperforate partition forming a pair of adjoining but non-communicating compartments, and provided with openings whereby air is permitted to circulate through one of the compartments, an internal combustion engine mounted in the other compartment and having a liquid type cooling system therefor including a radiator disposed in said one compartment, an electric generator mounted in said one compartment, connected for drive by the engine, embodying a shell around its operating parts, and having for purposes of cooling said operating parts a closed air circulating system including a hollow heat exchanger disposed outside of the shell but within the one compartment, and means for circulating air through said one compartment so that it flows past the heat exchanger and radiator.

2. An engine-generator unit comprising a housing having disposed therein a substantially imperforate partition forming a pair of adjoining but non-communicating compartments, and provided with openings whereby air is permitted to circulate through one of the compartments, an internal combustion engine mounted in the other compartment and having a liquid type cooling system therefor including a radiator disposed in said one compartment, an electric generator mounted in said one compartment, connected for drive by the engine, embodying a shell around its rotor and stator, and having for purposes of cooling said rotor and stator a closed air circulating system including a hollow heat exchanger disposed outside of the shell but within the one compartment, and power operated fan means positioned in said one compartment and arranged and adapted to circulate air through said one compartment and so that it flows past the heat exchanger and radiator.

3. An engine-generator unit comprising a horizontally elongated housing consisting of bottom, side, end and top walls, embodying an upstanding substantially imperforate partition therein dividing it into adjoining but non-communicating engine and generator compartments, and having in certain of the walls thereof a pair of openings communicating directly with the generator compartment and adapted to permit air to circulate therethrough, an internal combustion engine mounted in the engine compartment and having a liquid type cooling system including a radiator unit disposed in the generator compartment and extending across one of the openings, an electric generator mounted in said generator compartment, connected for drive by the engine, embodying a shell around its operating parts, and having for cooling purposes a closed air circulating system including a hollow heat exchanger disposed outside of the shell and adjacent the radiator, and fan means for circulating air through said generator compartment and past the heat exchanger and radiator.

4. An engine-generator unit comprising a horizontally elongated housing consisting of bottom, side, end and top walls, embodying an upstanding substantially imperforate partition therein dividing it into adjoining but non-communicating engine and generator compartments, and having in certain of the walls thereof a pair of openings communicating directly with the generator compartment and adapted to permit air to circulate therethrough, an internal combustion engine mounted in the engine compartment and having a liquid type cooling system including a radiator unit disposed in the generator compartment and extending across one of the openings, an electric generator mounted in said generator compartment, connected for drive by the engine, embodying a shell around its operating parts, and having for purposes of cooling said operating parts a closed air circulating system including a hollow heat exchanger disposed outside of the shell and adjacent the radiator, and a rotary power operated fan disposed adjacent the other opening and adapted when driven to circulate air through said generator compartment and past the heat exchanger and radiator.

5. An engine-generator unit comprising a horizontally elongated housing consisting of bottom, side, end and top walls, embodying an upstanding substantially imperforate partition therein dividing it into adjoining but non-communicating engine and generator compartments, and having in certain of the walls thereof a pair of openings communicating directly with the generator compartment and adapted to permit air to circulate therethrough, an internal combustion engine mounted in the engine compartment and having a liquid type cooling system including a radiator unit disposed in the generator compartment and extending across one of the openings, an electric generator mounted in said generator compartment, connected for drive by the engine, embodying a shell around its rotor and stator, and having for cooling purposes a closed air circulating system including a hollow heat exchanger disposed outside of the shell and adjacent the radiator, and a motor driven rotary suction fan mounted adjacent the other opening and adapted when driven to draw air into the generator compartment through said other opening and to force air successively past the heat exchanger and radiator and then to atmosphere via said one opening.

6. An engine-generator unit comprising a horizontally elongated housing consisting of bottom, side, end and top walls, embodying an upstanding substantially imperforate partition therein dividing it into adjoining but non-communicating engine and generator compartments, and having in its side walls opposed openings in direct communication with the side portions of the generator compartment and in another of its walls a hole adapted together with the openings to permit air to circulate through said generator compartment, an internal combustion engine mounted in the engine compartment and having a liquid type cooling system including a pair of radiator units disposed in the generator compartment and extending across said openings, an electric generator mounted in said generator compartment, connected for drive by the engine embodying a shell around its rotor and stator, and having for cooling purposes a closed air circulating system including heat exchanger tubes disposed outside of the shell and adjacent the radiator units, and fan means for circulating air through said generator compartment past the heat exchanger tubes and the radiator units.

7. An engine-generator unit comprising a horizontally elongated housing consisting of top, side, end and bottom walls, embodying an upstanding substantially imperforate transversely extending partition therein dividing it into adjoining but non-communicating engine and generator compartments, having openings in its side walls communicating directly with the side portions of the generator compartment, and having in the end wall thereof that defines the outer end of said generator compartment a hole adapted together with said openings to permit air to circulate through the generator compartment, an internal combustion engine mounted in the engine compartment and having a liquid type cooling system including a radiator unit disposed in the generator compartment and extending across one of the openings, an electric generator mounted in the generator compartment, connected for drive by the engine, embodying a shell around its operating parts, and having for purposes of cooling said operating parts a closed air circulating system including horizontally extending heat exchanger tubes disposed outside of the shell and directly inwards of the radiator units, and power operated fan means for circulating air through said generator compartment and past the heat exchanger tubes and the radiator units.

8. An engine-generator unit comprising a horizontally elongated housing consisting of bottom, side, end and top walls, embodying an upstanding substantially imperforate transversely extending partition therein dividing it into adjoining but non-communicating engine and generator compartments, having openings in its side walls communicating directly with the side portions of the generator compartment, and having in the upper corner portions of the end wall thereof that defines the outer end of said generator compartment a pair of holes adapted together with the aforesaid openings to permit air to circulate through the generator compartment, an internal combustion engine mounted in the engine compartment and having a liquid type cooling system including a radiator unit disposed in the generator compartment and extending across one of the openings, an electric generator mounted in the generator compartment, connected for drive by the engine, embodying a shell for its rotor and stator, and having for cooling purposes a closed air circulating system including horizontally extending heat exchanger tubes disposed outside of the shell and directly inwards of the radiator units, and a pair of rotary power driven fans disposed adjacent the holes and adapted when driven to circulate air through the generator compartment and past the heat exchanger tubes and the radiator units.

9. An engine-generator unit comprising a horizontally elongated housing consisting of bottom, side, end and top walls, embodying an upstanding substantially imperforate transversely extending partition therein dividing it into adjoining but non-communicating engine and generator compartments, having openings in its side walls communicating directly with the side portions of the generator compartment, and having in the upper corner portions of the end wall thereof that defines the outer end of said generator compartment a pair of holes adapted together with the aforesaid openings to permit air to circulate through the generator compartment, an internal combustion engine mounted in the engine compartment and having a liquid type cooling system including a radiator unit disposed in the generator compartment and extending across one of the openings, an electric generator mounted in the generator compartment, connected for drive by the engine, embodying a shell for its operating parts, and having for cooling purposes a closed air circulating system including horizontally extending heat exchanger tubes disposed outside of the shell and directly inwards of the radiator units, and a pair of rotary motor driven suction fans extending across the holes and adapted when driven to draw air into the generator compartment and to force the air under pressure successively past the heat exchanger tubes and the radiator units and thence to atmosphere via the openings in said side walls of the housing.

10. An engine-generator unit comprising a horizontally elongated housing consisting of bottom, side, end and top walls, embodying an upstanding substantially imperforate partition therein dividing it into adjoining but non-communicating engine and generator compartments, and having in its side walls opposed openings in direct communication with the side portions of the generator compartment and in another of its walls a hole adapted together with the openings to permit air to circulate through said generator compartment, an internal combustion engine mounted in the engine compartment and having a liquid type cooling system including a pair of radiator units disposed in the generator compartment and extending across said openings, and an electric generator mounted in the generator compartment and connected for drive by the engine, and fan means for circulating air through said generator compartment and past the radiator units.

11. An engine-generator unit comprising a horizontally elongated housing consisting of bottom, side, end and top walls, embodying an upstanding substantially imperforate partition therein dividing it into adjoining but non-communicating engine and generator compartments, and having in its side walls opposed openings in direct communication with the side portions of the generator compartment and in another of its walls a hole adapted together with the openings to permit air to circulate through said generator compartment, an internal combustion engine mounted in the engine compartment, an electric generator mounted in the generator compartment, connected for drive by the engine, embodying a shell around its rotor and stator, and having for cooling purposes a closed air circulating system including horizontally extending heat exchanger tubes adjacent said openings, and fan means for circulating air through the generator compartment and past the heat exchanger tubes.

LEE W. MELCHER.

REFERENCES CITED

The following references are of record in the file of this patent:

UNITED STATES PATENTS

| Number | Name | Date |
| --- | --- | --- |
| 1,522,612 | Burchett | Jan. 13, 1925 |
| 1,723,851 | Gumpper | Aug. 6, 1929 |
| 2,019,026 | Spear et al. | Oct. 29, 1935 |
| 2,086,036 | Juergens | July 6, 1937 |
| 2,177,687 | Bracken et al. | Oct. 31, 1939 |
| 2,355,208 | Devol et al. | Aug. 8, 1944 |